US 6,709,261 B2

(12) United States Patent
Cargile et al.

(10) Patent No.: US 6,709,261 B2
(45) Date of Patent: Mar. 23, 2004

(54) MULTI-PARISON/DUAL CAVITY WHEEL BLOWMOLDS

(75) Inventors: David W. Cargile, Lititz, PA (US); Roy N. Krohn, York, PA (US)

(73) Assignee: Graham Packaging Company, L.P., York, PA (US)

( * ) Notice: Subject to any disclaimer, the term of this patent is extended or adjusted under 35 U.S.C. 154(b) by 0 days.

(21) Appl. No.: 09/814,793

(22) Filed: Mar. 23, 2001

(65) Prior Publication Data

US 2002/0136794 A1 Sep. 26, 2002

(51) Int. Cl.⁷ .......................... B29C 49/38; B29C 49/60
(52) U.S. Cl. .................. 425/536; 425/532; 425/540; 264/527
(58) Field of Search ................................ 264/527, 543, 264/540, 542; 425/540, 536, 532, 538, 539

(56) References Cited

U.S. PATENT DOCUMENTS

| 2,784,452 A | * | 3/1957 | Ruekberg et al. ........... 425/536 |
| 3,802,823 A | * | 4/1974 | Doughty et al. ............. 425/532 |
| 3,895,897 A | * | 7/1975 | Hudson ....................... 425/540 |
| 4,007,244 A | * | 2/1977 | Avery et al. ................. 425/532 |
| 4,498,854 A | | 2/1985 | Ross |
| 4,592,720 A | | 6/1986 | Dugan et al. |
| 4,605,839 A | | 8/1986 | Rasmussen et al. |
| 4,802,832 A | | 2/1989 | Shapler |
| 4,940,403 A | | 7/1990 | Hirschberger |
| 4,946,366 A | * | 8/1990 | Dundas et al. .............. 425/536 |
| 4,954,310 A | * | 9/1990 | Andersen ..................... 425/540 |
| 5,551,860 A | | 9/1996 | Budzynski et al. |
| 5,551,862 A | | 9/1996 | Allred, Jr. |
| 5,681,596 A | | 10/1997 | Mills et al. |
| 5,840,349 A | | 11/1998 | Brown, Jr. et al. |
| 5,948,346 A | | 9/1999 | Mills et al. |

OTHER PUBLICATIONS

"Support Graham Container", D. Graham, Sep. 21, 1988.
"Inter–Office Correspondence", Joe Spohr, Sep. 16, 1997.
"Inter–Office Correspondence", Tom Kurtz, Jan. 8, 1998.
"Graham Engineering Corporation", Hal Koplin, Dec. 23, 1997.
"Graham Packaging and Graham Engineering", Jan. 5, 1999.
"7 Sheets of Drawings Nos. 4879–4885", Kennedy Tool and Die Inc., Mar. 11, 1997.

* cited by examiner

Primary Examiner—Robert B. Davis
(74) Attorney, Agent, or Firm—Venable; James R. Burdett

(57) ABSTRACT

In blow molding, each mold has two or more cavities, each respectively fed by two or more parisons. Each cavity fed by a separate parison may itself include two or more article cavities aligned with its parison.

9 Claims, 3 Drawing Sheets

MULTI-PARISON/DUAL CAVITY WHEEL BLOWMOLDS

BACKGROUND OF THE INVENTION

This invention relates to blow molding, and more particularly to an improved blow mold in which two or more article molding cavities are formed in each mold fed respectively by two or more parisons.

As will be appreciated by those skilled in the art, blow molding technology is widely used to manufacture hollow plastic articles, such as containers. A parison is formed by extruding a thermoplastic material and the parison is positioned between the separated halves of a mold. The mold halves are closed around the parison and a separation assembly separates the portion of the parison in the mold from the extruded parison outside the mold. Air is injected into the parison inside the mold to press the outer surface of the parison against the inner surface of the mold. When the object thusly formed cools, the mold is opened and the object is ejected from the mold. FIG. 1 illustrates a blow molding machine of the type used in the art, in which a series of molds are carried on a rotating wheel 6. In this machine, the parison is inserted from below into each mold when the mold reaches the nine o'clock position in the rotating cycle. The blow molded object cools as the wheel rotates in a clockwise direction. The mold opens, and the object is ejected, when it reaches the six o'clock position.

In prior vertical wheel blow molding machines of the type just described, typically there is one article forming cavity per mold on the wheel fed by a single parison. In some prior art vertical wheel blow molding applications, molds 7 are used with two article forming cavities 8, as shown in FIG. 2. In this prior art design, both cavities 8 are in line with a single parison injector and are both fed by a single parison.

SUMMARY OF THE INVENTION

An object of this invention is the provision of a novel blow mold that increases the capacity of blow molding machines. Another object of the invention is the provision of a novel blow mold that increases the capacity of existing wheel blow molding machines without increasing the manpower to operate them or requiring a substantial increase in capital costs.

Briefly, this invention contemplates the provision of a blow mold in which each mold has two or more cavities, each respectively fed by two or more parisons. Each cavity fed by a separate parison may itself include two or more article cavities aligned with the parison.

BRIEF DESCRIPTION OF THE DRAWINGS

The foregoing and other objects, aspects and advantages will be better understood from the following detailed description of a preferred embodiment of the invention with references to the drawings, in which.

DETAILED DESCRIPTION OF THE INVENTION

Figure 1:
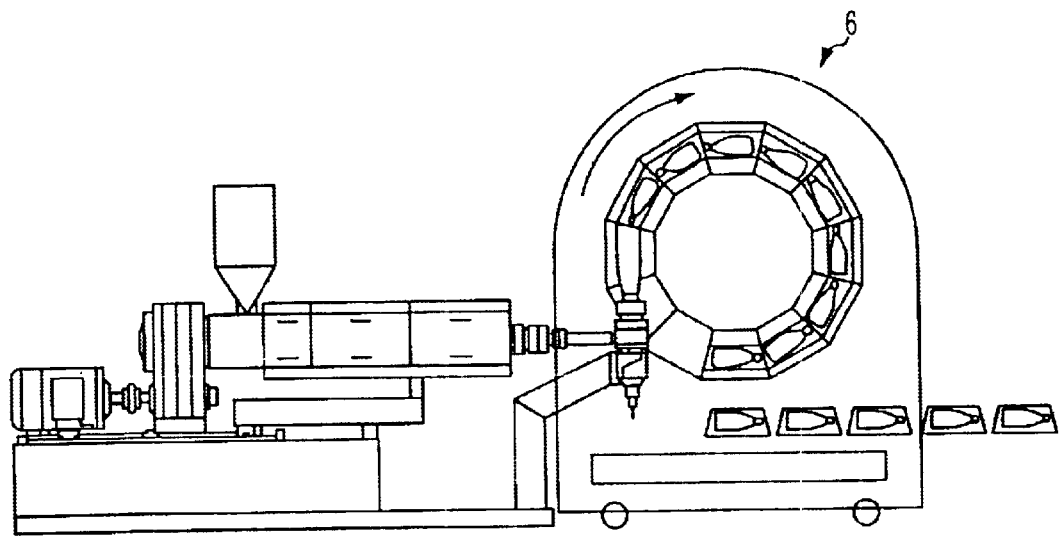
FIG. 1 is a pictorial view of a vertical wheel blow molding machine of a type known in the prior art to which the teachings of this invention apply.
Figure 2:
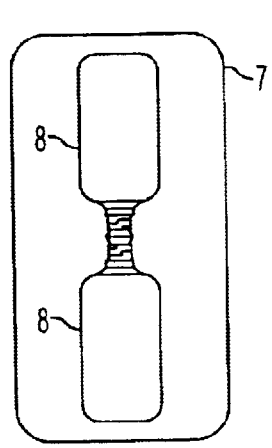
FIG. 2 is a pictorial view of one-half of a multi-cavity mold of the type used in the prior art where the cavities in the mold are disposed in a line with respect to the parison that feeds the mold.
Figure 3:
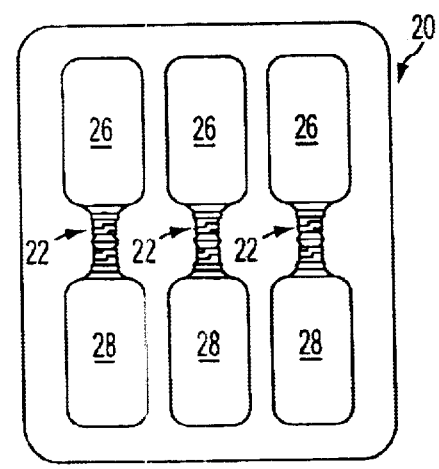
FIG. 3 is a pictorial view, similar to the view in FIG. 2, of one-half of a multi-cavity mold in accordance with the teachings of this invention.
Figure 4A:
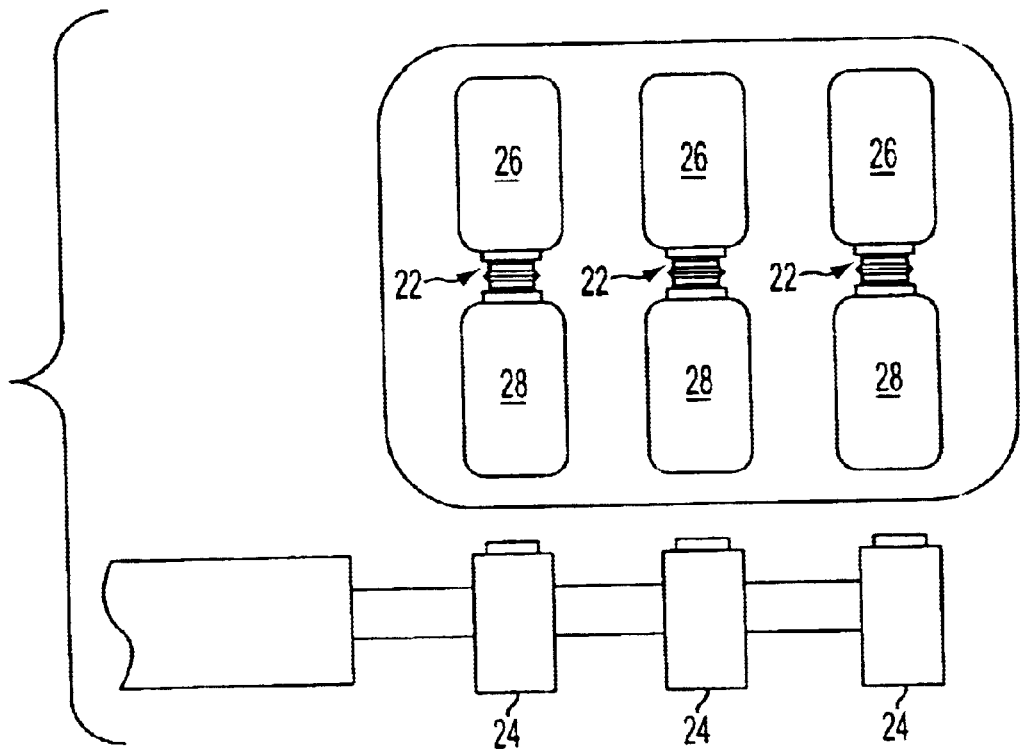
FIG. 4A is a partial, schematic view of the mold cavity shown in FIG. 3, mounted in a vertical wheel blow molding machine of the type shown in FIG. 1.
Figure 4B:
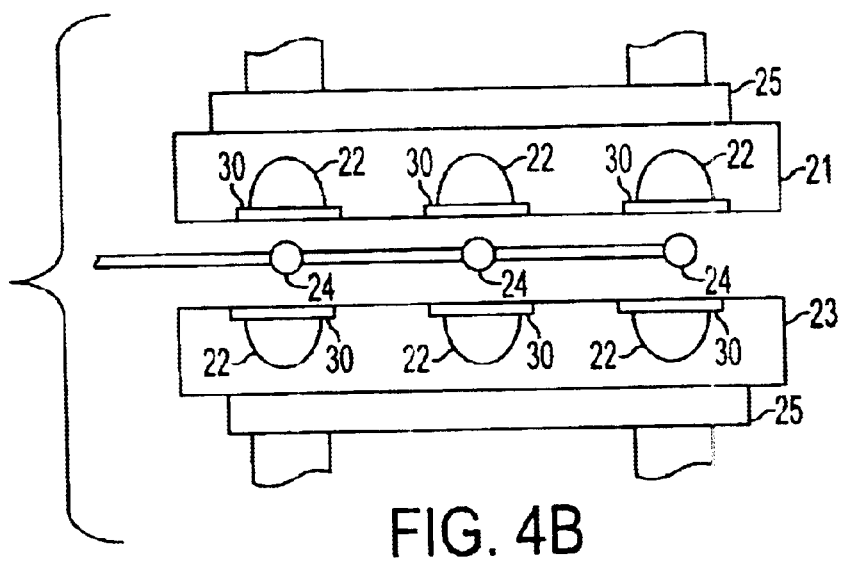
FIG. 4B is a partial, schematic of FIG. 4A viewed looking down from above the injectors, and showing both halves of the mold cavity.

Referring now to FIGS. 3, 4A and 4B, a mold 20, which is comprised of mold halves 21 and 23, is secured to support members 25 of the vertical wheel 6 of the molding machine shown in FIG. 1. In accordance with the teachings of this invention, mold 20 has two or more object forming cavities 22 (in this exemplary embodiment three) fed respectively by separate parison injectors 24. For the purpose of generality, each of the separate cavities 22 is shown with an upper container cavity 26 and a lower container cavity 28 both aligned with the parison that feeds the cavity. Each cavity 22 in this exemplary embodiment thus produces two containers that are attached together and each mold produces three pairs of such objects. Obviously, each cavity may produce a single object and there may be only two cavities 22 or more than three cavities in a single mold, each cavity fed by a separate parison. In the six o'clock position of FIG. 1, which is schematically illustrated in FIG. 4A, the mold cavities 22 are aligned in a horizontal plane. Likewise, the parison injectors 24 are aligned in the horizontal plane. Each mold cavity preferably has a separate parison separation assembly 30, as disclosed in copending application Ser. No. 09/760, 734, filed Jan. 17, 2001, and assigned to the assignee of this invention.

All of the blow molded objects should be ejected from a mold at the same time in order to prevent the ejected objects from jamming up on the downstream conveyers. To this end, the ejector assemblies should be mounted together at one end of the mold to make the individually blow molded objects drop as one.

Figure 5:
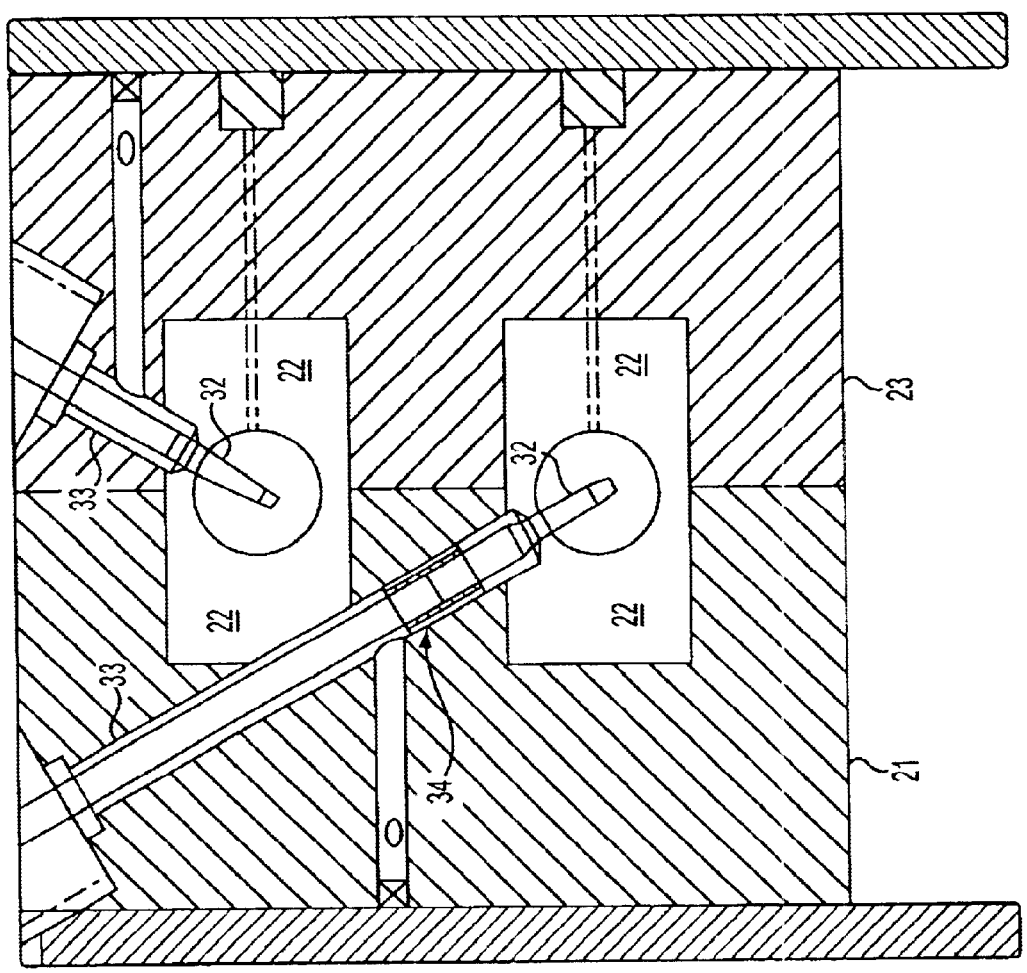
FIG. 5 is a view of a dual parison mold in accordance with the teaching of this invention, showing the separate blow tubes and blow needles for each cavity.

FIG. 5 relates to a dual cavity, dual parison mold. Each parison is inflated, after the mold is closed, by a respective different one of the needles 32 which are inserted in a respective different one of the cylinders 33 formed in the molds. Here it should be noted, a guide bushing 34 is provided in the longer cylinder 33 located closely adjacent the region where the needle is inserted into the outboard parison in order to insure the parison is blown and to avoid binding of the needle.

While the invention has been described in terms of a single preferred embodiment, those skilled in the art will recognize that the invention can be practiced with modification within the spirit and scope of the appended claims.

What is claimed is:

1. A multi-parison, multi-cavity blow mold comprising in combination:

a blow mold comprised of a pair of mold halves, which when closed together, form a plurality of article forming cavities, each of said cavities being fed by a separate parison, which is inflated by a corresponding needle through respective separate openings in the periphery of the mold, at least a first and second needle opening being provided from a same side of the mold through different ones of said mold halves such that at least one of the needle openings is longer than the other to allow insertion of a needle into an outboard parison.

2. A vertical wheel blow molding machine comprising in combination;
- a wheel on which is mounted a plurality of molds, said wheel rotating said molds between a parison injection position and an article ejection station;
- a blow mold comprised of a air of mold halves which when closed together, form a plurality of article forming cavities, each of said cavities being fed by a separate parison through respective separate openings in the periphery of the mold at least a first and second opening being provided from a same side of the mold through different ones of said mold halves such that at least one of the openings is longer than the other to allow insertion of a needle into an outboard parison;
- a plurality of parison injectors at said parison injection position for injecting respectively a parison into each of said mold cavities.

3. A vertical wheel blow molding machine as in claim 2 wherein each cavity includes two article-forming cavities aligned with said parison.

4. A vertical wheel blow molding machine as in claim 2 further including a separate cylinder in said each of said molds providing a channel through which each said needle can be inserted to inflate each respective parison.

5. A vertical wheel blow molding machine as in claim 4 wherein at least one of said channels including a bushing located adjacent a region where the needle enters the parison.

6. A vertical wheel blow molding machine as in claim 3 further including a separate cylinder in said each of said molds providing a channel through which a needle can be inserted to inflate each respective parison.

7. A vertical wheel blow molding machine as in claim 6 wherein at least one of said channels includes a bushing located adjacent a region where the needle enters the parison.

8. A multi-parison, multi-cavity blow mold as in claim 1 further including a separate cylinder in said each of said molds providing a channel through which a needle can be inserted to inflate each respective parison.

9. A multi-parison, multi-cavity blow mold as in claim 1 wherein at least one of said channels including a bushing located adjacent a region where the needle enters the parison.

* * * * *

UNITED STATES PATENT AND TRADEMARK OFFICE
CERTIFICATE OF CORRECTION

PATENT NO. : 6,709,261 B2
DATED : March 23, 2004
INVENTOR(S) : David W. Cargile et al.

It is certified that error appears in the above-identified patent and that said Letters Patent is hereby corrected as shown below:

Column 3,
Line 6, please insert the letter "p" before the word "air" such that the phrase reads -- a pair of mold halves --
Line 10, please insert a comma after the word "mold" such that line 10, reads -- in the periphery of the mold, at least a first and second --

Signed and Sealed this

Sixteenth Day of November, 2004

JON W. DUDAS
*Director of the United States Patent and Trademark Office*